(12) United States Patent
Hsu et al.

(10) Patent No.: US 6,338,902 B1
(45) Date of Patent: Jan. 15, 2002

(54) VIEWING ANGLE COMPENSATOR FOR LIQUID CRYSTAL DISPLAY AND METHOD FOR FABRICATING THE SAME

(75) Inventors: Chain-Shu Hsu, Hsinchu; Hwai-Len Chen, Illan, both of (TW)

(73) Assignee: National Science Council, Taipei (TW)

( * ) Notice: Subject to any disclaimer, the term of this patent is extended or adjusted under 35 U.S.C. 154(b) by 0 days.

(21) Appl. No.: 09/699,380

(22) Filed: Oct. 31, 2000

(51) Int. Cl.[7] .............................................. B32B 27/36
(52) U.S. Cl. ...................................................... 428/412
(58) Field of Search ........................................ 428/412

(56) References Cited

U.S. PATENT DOCUMENTS 5,456,867 A * 10/1995 Mazaki et al. ............... 264/2.6
5,526,150 A * 6/1996 Mazaki et al. ................ 359/73

* cited by examiner

Primary Examiner—Terressa M. Boykin
(74) Attorney, Agent, or Firm—Oblon, Spivak, McClelland, Maier & Neustadt, P.C.

(57) ABSTRACT

A method for producing a viewing angle compensator includes steps of aligning two substrates, injecting a UV-curable liquid crystal monomer between the two substrates and polymerizing the UV-curable liquid crystal monomer to form a viewing angle compensator for the liquid crystal display. The compensator for a liquid crystal display has a retardation, in the range between 100 and 1000 nm.

13 Claims, 10 Drawing Sheets

VIEWING ANGLE COMPENSATOR FOR LIQUID CRYSTAL DISPLAY AND METHOD FOR FABRICATING THE SAME

FIELD OF THE INVENTION

The present invention relates to a viewing angle compensator for a liquid crystal display, and more particularly to a method for fabricating a viewing angle compensator for a liquid crystal display.

BACKGROUND OF THE INVENTION

Because liquid crystal display has the advantages of small size, light weight, low driving voltage, low power consumption and good portability, it has been widely used as displays of a portable television, a laptop personal computer, a notebook, an electronic watch, a calculator, a mobile phone and an office automation device. The typical liquid crystal displays are generally classified into two types: a simple matrix type super twisted nematic liquid crystal display (STN-LCD) and an active matrix type thin film transistor-twist nematic liquid crystal display (TFT-TN LCD).

In a simple matrix type STN-LCD, the arrangement of the liquid crystal molecules is twist-aligned at an angle of about 180 to 240 degree in a direction from one substrate to the other. Such STN-LCD has advantages of great screen quality, high visual contrast and steep electro-optic characteristics. However, the STN-LCD also has some drawbacks such as a chromatic aberration and a narrow viewing angle. The phenomenon of chromatic aberration is caused when an incident light is at first linearly polarized upon transmitting through a polarizing plate and then enters through a liquid crystal cell to become an elliptically polarized light by the influence of non-uniform refraction and twist of the liquid crystal. Since the degree of elliptic polarization is dependent on the wavelength, the intensity of the transmitted light varies upon partially filtering portions of the wavelength through an analyzer arranged on the exit side of the liquid crystal cell, which results in a coloration of the display.

In an active matrix type of TFT-TN LCD, the arrangement of the liquid crystal molecules is twist-aligned at an angle of 90 degree in a direction from one substrate to the other. The TFT-TN LCD has a higher contrast and a wider viewing angle than those of the simple matrix type STN-LCD. The TFT-TN LCD also has advantages of high shading contrast (can be up to 100:1), rapid response and the characteristic of gray scale. However, the problem of the TFT-TN LCD involves that a reversal of brightness occurs at different viewing angles.

Please refer to FIG. 1, a relation between the voltage applied to the liquid crystal layer and the transmissivity at different viewing angles is illustrated. This relation is generally not linear. Such liquid crystal display comprises two substrates 1 in parallel to each other and liquid crystalline molecules 2. When the liquid crystal display is observed in the direction of A, the change of transmissivity can be easily distinguished between the state of power on and the state of power off. When the liquid crystal display is observed in the direction of B, the transmissivity is difficult to be reduced. With regard to the observation in the direction of C, the transmissivity reduces rapidly to zero as the driven voltage increases, however, some transmissivity appears when the voltage is further increased. It is apparent that the viewing angle is too narrow.

In connection with liquid crystal display, various display methods have been proposed to overcome the problem described above. For example, the compensators made of a uniaxial stretching polymer film, a liquid crystalline polymer, a polyimide film have been described. The uniaxial polymer film, such as polycarbonate, polyvinyl alcohol, polyethylene terephthalate and polysulfone, is a widely used material for manufacturing a compensator. The problems exist in point of manufacture and cost due to the difficulty of controlling the birefringence of the uniaxial stretching polymer film. The use of a liquid crystalline polymer involves problems; for example, the orienting process requires much time and labor and it is difficult to control the film thickness due to high viscosity thereof. However, a compensator made of a liquid crystalline polymer possesses better characteristics, e.g. birefringence property, than those of stretched films. The method for producing polyimide films is easy; however, the performance of improving viewing angle for a liquid crystal display is not satisfactory by using such polyimide films.

Therefore, the present invention provides an improved method for overcoming the problems described above.

SUMMARY OF THE INVENTION

An object of the present invention is to provide a method for producing a viewing angle compensator for liquid crystal display.

Another object of the present invention is to provide a compensator which is an aligned liquid crystal polymeric film for improving viewing angle and coloration for a liquid crystal display.

According to the present invention, the method for producing a viewing angle compensator includes steps of a) aligning two substrates, b) injecting a UV-curable liquid crystal monomer between the two substrates and c) polymerizing the UV-curable liquid crystal monomer to form a viewing angle compensator for the liquid crystal display.

In accordance with an aspect of the present invention, the step a) includes steps of a1) coating an alignment film on each of the two substrate and a2) orientatedly rubbing the alignment film.

Preferably, the alignment film is cross-linked with a polymeric material, which is one selected from a group consisting of ployimide and polyvinyl alcohol.

Preferably, each of the two substrates is a glass substrate.

More specially, each of the two substrates is a transparent plastic substrate, which is one selected from a group consisting of polycarbonate, polyethersulfone, polymethylmethacrylate and polytriacetyl cellulose.

In accordance with another aspect of the present invention, the two substrates are disposed in one of parallel alignment and twisted alignment.

In accordance with another aspect of the present invention, the twisted alignment of the liquid crystal monomer is twist-aligned at an angle of about 90 to 270 degree.

Preferably, the liquid crystal monomer is one selected from a group consisting of liquid crystal acrylate, liquid crystal methyl acrylate, liquid crystal ethylene oxide, liquid crystal bisacrylate, liquid crystal bismethylacrylate and liquid crystal bisethyleneoxide. The formula of such monomer is described as follows:

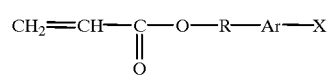

(liquid crystal acrylate)

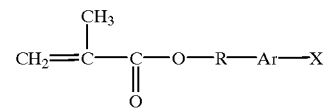

(liquid crystal methyl acrylate)

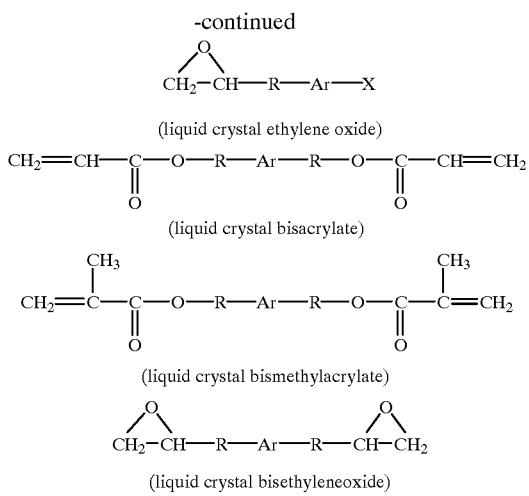

(liquid crystal ethylene oxide)

(liquid crystal bisacrylate)

(liquid crystal bismethylacrylate)

(liquid crystal bisethyleneoxide)

where R is one of methylene and methylenoxy, X is a terminated radical selected from a group consisting of cyano, alkanoxy and alkyl, and Ar is a radical group selected from a group consisting of

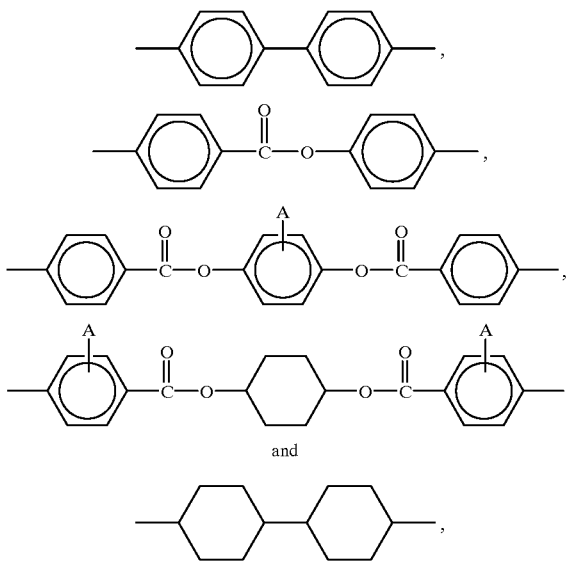

and where A is one selected from a group consisting of hydrogen, alkyl and halogen.

In accordance with another aspect of the present invention, prior to the step b) further includes a step b1) mixing the UV-curable liquid crystal monomer and a non-liquid crystal monomer.

Preferably, the non-liquid crystal monomer is one selected from a group consisting of non-liquid crystal bisacrylate, non-liquid crystal bismethylacrylate and non-liquid crystal bisethyleneoxide. The formula of such monomer is described as follows:

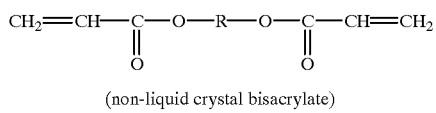

(non-liquid crystal bisacrylate)

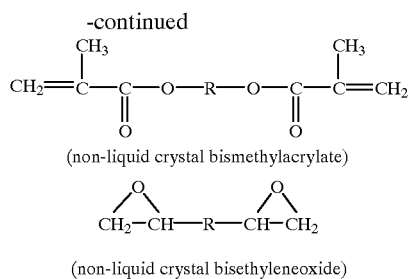

(non-liquid crystal bismethylacrylate)

(non-liquid crystal bisethyleneoxide)

where R is one of methylene and methylenoxy.

In accordance with another aspect of the present invention, between the step b1) and b) further includes a step b2) adding a photoinitiator to the liquid crystal monomer.

Preferably, the photoinitiator is a radical photoinitiator selected from a group consisting of benzoin, benzil and benzophenone.

Preferably, the photoinitiator is a cationic photoinitiator selected from a group consisting of biphenyliodonium hexafluoroarsenate, diaryliodonium hexafluoroantimonate and triarylsulfonium hexafluoroantimonate.

In accordance with another aspect of the present invention, the step c) is conducted by polymerizing the UV-curable liquid crystal monomer at a polymerizing temperature.

Preferably, the polymerizing temperature is in the range between 30° C. and 150° C.

Another object of the present invention is to provide a compensator for a liquid crystal display, wherein the compensator is an aligned liquid crystal polymeric film constituted with a UV-curable liquid crystal monomer on a substrate.

In accordance with another aspect of the present invention, the aligned liquid crystal polymeric film of is disposed in one of parallel alignment and twisted alignment.

In accordance with another aspect of the present invention, the monomer is twist-aligned at an angle of 90 to 270 degree.

Preferably, the liquid crystal polymer of the compensator is one selected from a group consisting of liquid crystal acrylate, liquid crystal methyl acrylate, liquid crystal ethylene oxide, liquid crystal bisacrylate, liquid crystal bismethylacrylate and liquid crystal bisethylene oxide.

Preferably, the polymeric film of the compensator further includes a non-liquid crystal monomer, which is one selected from a group consisting of non-liquid crystal bisacrylate, non-liquid crystal bismethylacrylate and non-liquid crystal bisethyleneoxide.

In accordance with another aspect of the present invention, a retardation, defined as a product of a birefringence ($\Delta n$) and a film thickness (d) of the aligned liquid crystal polymeric film is in the range between 100 and 1000 nm.

In accordance with another aspect of the present invention, the compensator includes a transparent substrate.

Preferably, the transparent substrate is a glass substrate.

More specially, the transparent substrate is a plastic substrate selected from a group consisting of polycarbonate, polyethersulfone, polymethylmethacrylate and polytriacetyl cellulose.

The polymeric film obtained according to the method of the present invention shows highly optical anisotropy. The polymeric film having highly optical anisotropy can be used as a viewing angle compensator for STN-LN liquid crystal display. This compensator permits a black-and-white display and a wider viewing angle.

The polymeric film having highly optical anisotropy according to the present invention can be also used as a viewing angle compensator for TN liquid crystal display. This compensator permits a display having a wider viewing angle.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENTS

Please refer FIGS. 2 to 5. The present invention provides four representative liquid crystal monomers shown as follows:

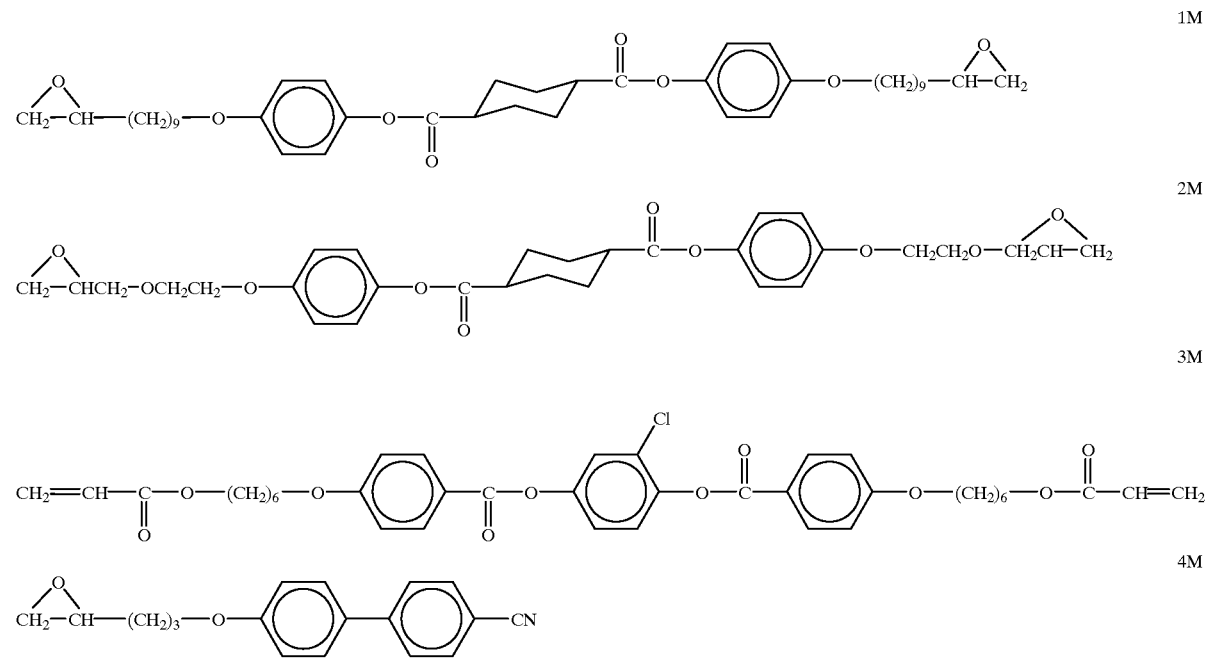

Such liquid crystal monomers have a broad temperature range of a liquid crystal. Table 1 shows the phase transitional temperature of the liquid crystal and enthalpy change measured by a differential scanning calorimeter, DSC.

TABLE 1

| Monomer | | phase transitional temperature ° C. (enthalpy change mJ/mg) |
|---|---|---|
| | | phase transitional temperature and enthalpy change |
| 1 M | heating | K 93.1(62.1) $S_B$ 107.8(4.5) $S_A$ 129.6(1.0) N 142.8(1.3) I |
| | cooling | I 139.9(−0.1) N 126.7(−0.8) $S_A$ 104.4(−7.1) $S_B$ 75.8(−70.8) K |

TABLE 1-continued phase transitional temperature and enthalpy change

| Monomer | | phase transitional temperature ° C. (enthalpy change mJ/mg) |
|---|---|---|
| 2 M | heating | K 93.6.(99.2) N 158.4(0.8) I |
| | cooling | I 156.0(−1.5) N 94.0(−0.4) $S_A$ 60.6(−43.1) K 52.5(45.0) $K_1$ |
| 3 M | heating | K 65.7(66.6) N 116.5(0.8) I |
| | cooling | I 113.1(−1.1) N 24.9(−50.4) K |
| 4 M | heating | K 77.1(104.1) I |
| | cooling | I 59.7(−4.5) N 29.7(−85.6) K |

K: crystalline phase,
N: nematic liquid crystal phase,
$S_A$: smetic A type liquid crystal phase,
$S_B$: smetic B type liquid crystal phase,
I: homogeneous phase

EXAMPLE 1

Synthesis of Representative Monomer 1M

Figure 1:
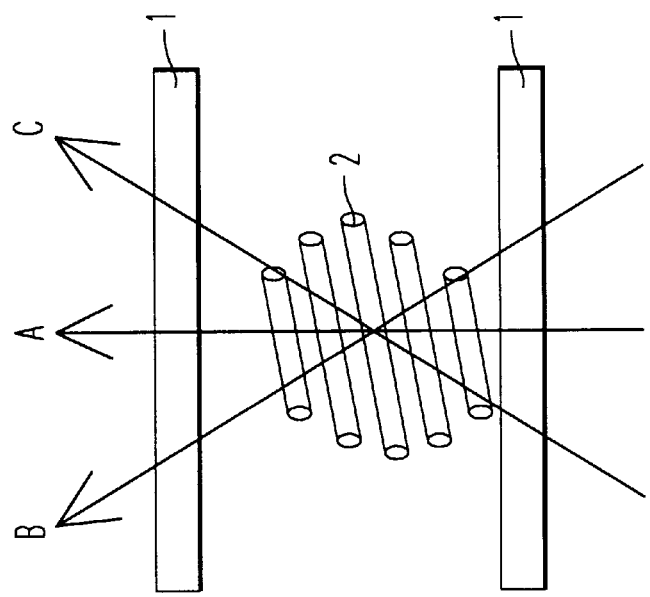
FIG. 1 is a relation between the voltage applied to an active matrix type nematic liquid crystal display and the transmissivity at different viewing angles according to prior art.
Figure 1:
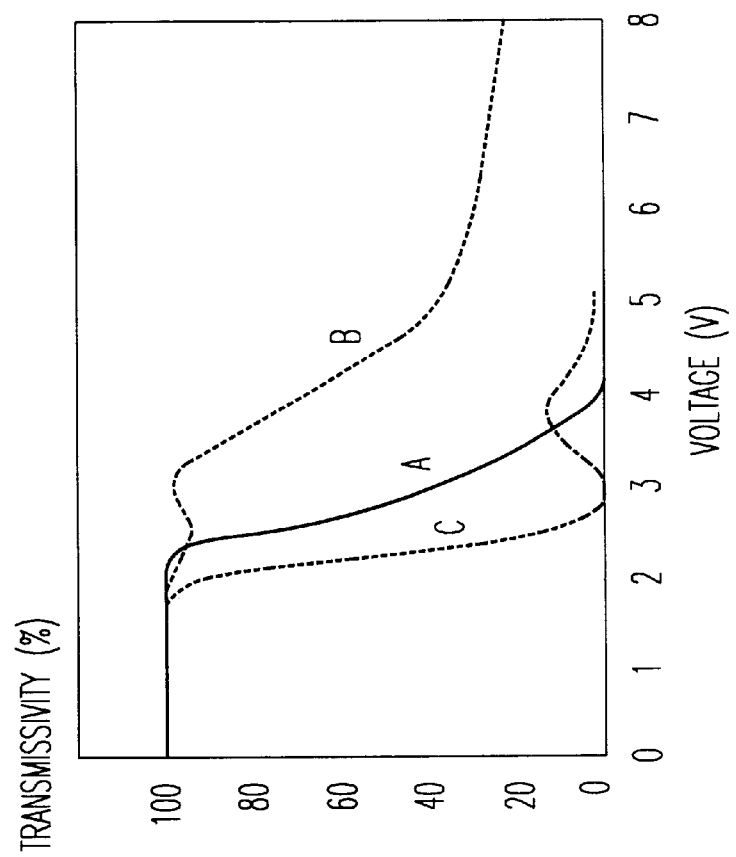
Figure 2:
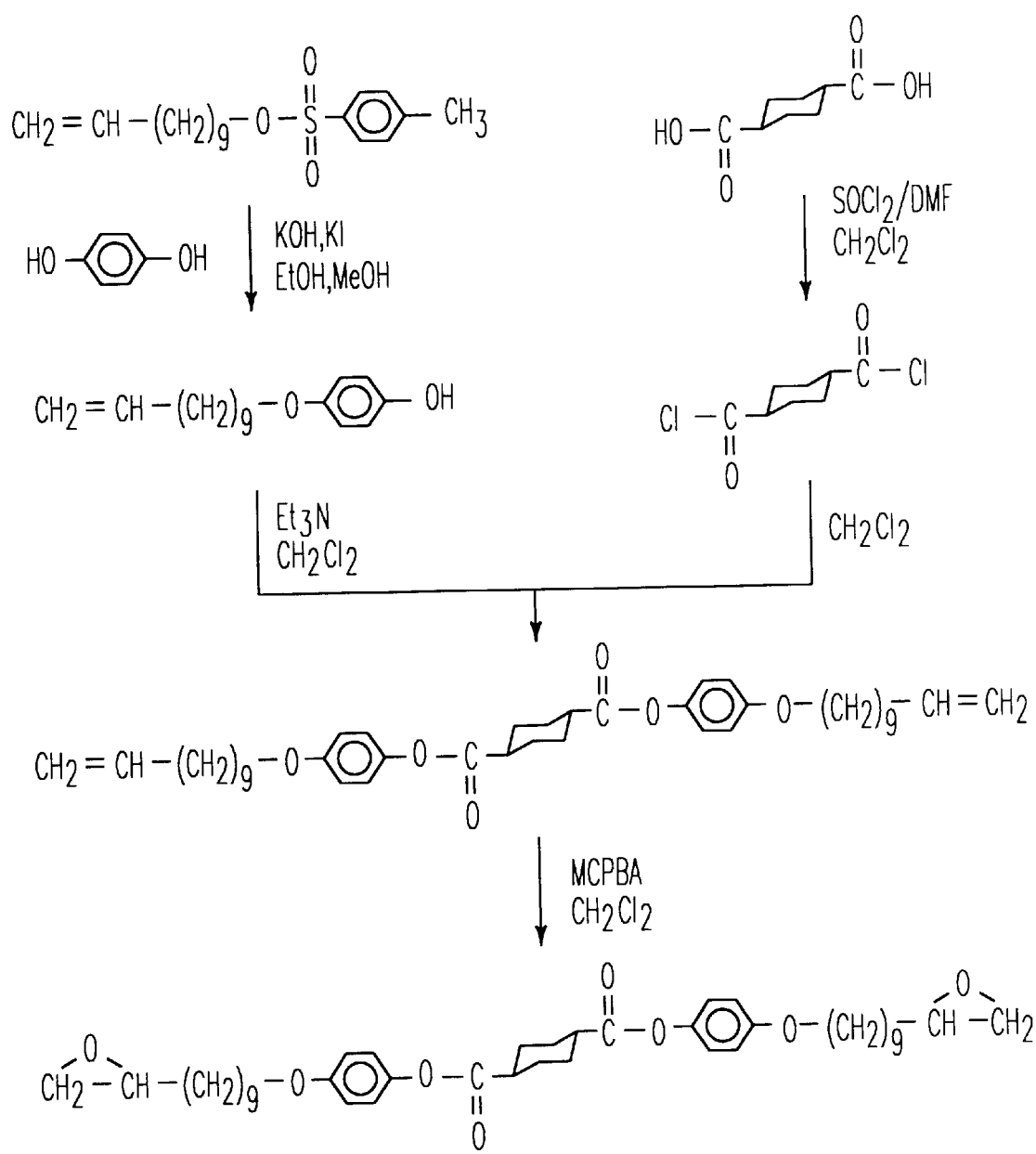
FIG. 2 is a flow diagram for synthesizing of a representative monomer 1M according to the present invention.

FIG. 2 is a flow diagram showing the steps of synthesizing a representative monomer 1M according to the present invention. In a 50 ml of bi-neck bottle, 3.28 g of hydroquinone, 1.96 g of potassium hydroxide, 0.50 g of potassium iodide, 10.0 ml of methanol and 20.0 ml of ethanol are introduced and mixed. 3.00 g of 11-tolylsulfonyloxy-1-undecene is dropped slowly into the bottle and the resulting mixture is subsequently heated to the boiling point thereof. After the solvent is distillated off, 100.0 ml of cold water is added and 6N HCl is dropped until the mixture becomes acidic. Then the resulting mixture is subjected to extraction using ether. The organic layer is subjected to dehydration using magnesium sulfate, filtration, concentration and further purification with silica gel column chromatography, thereby obtaining a white solid product, 4-(10-undecenoxy)phenol.

In a first tri-necked bottle, 5.0 g of 4-(10-undecenoxy)phenol, 2.5 ml of triethylamine, $Et_3N$, and 1.0 ml of anhydrous dichloromethane, $C_2H_2Cl_2$, are introduced to form a clear solution.

In a second tri-necked bottle, 1.81 g of trans-cyclohexane-1,4-dicarboxylic acid, 2 drops of N,N-dimethylformamide, DMF, and 5.0 ml of anhydrous dichloromethane are introduced and 6.00 g of sulfonylchloride, $SOCl_2$, is injected with a needle. After the solution is clear for 1 hr, the remainder sulfonylchloride and solvent are drawn out, extra 5.0 ml of anhydrous dichloromethane is introduced and then the bottle is put in an ice bath. The solution in the first tri-necked bottle is injected into the second tri-necked bottle with a needle for carrying out a reaction at room temperature. The resulting product is subjected to extraction with dichloromethane and water. The organic layer is subjected to dehydration using magnesium sulfate, filtration, concentration and further purification with silica gel column chromatography, thereby obtaining a white crystalline, trans-1,4-bis[4-(10-undecenoxy)phenyl]cyclohexanedicarboxylate.

In a 50 ml of brown di-necked bottle, 5.18 g of meta-chloroperoxybenzoic acid, MCPBA, and 25.0 ml of anhydrous dichloromethane are introduced. After MCPBA is fully dissolved, the trans-1,4-bis[4-(10-undecenoxy)phenyl]cyclohexanedicarboxylate produced is dissolved in 10.0 ml of dichloromethane and then dropped into the brown di-necked bottle via a separatory funnel. The organic layer is subjected to dehydration using magnesium sulfate, filtration, concentration and further purification with silica gel column chromatography, thereby obtaining a white crystalline, i.e. the representative monomer, 1M. Yield: 80.0%.

EXAMPLE 2

Synthesis of Representative Monomer 2M

Figure 3:
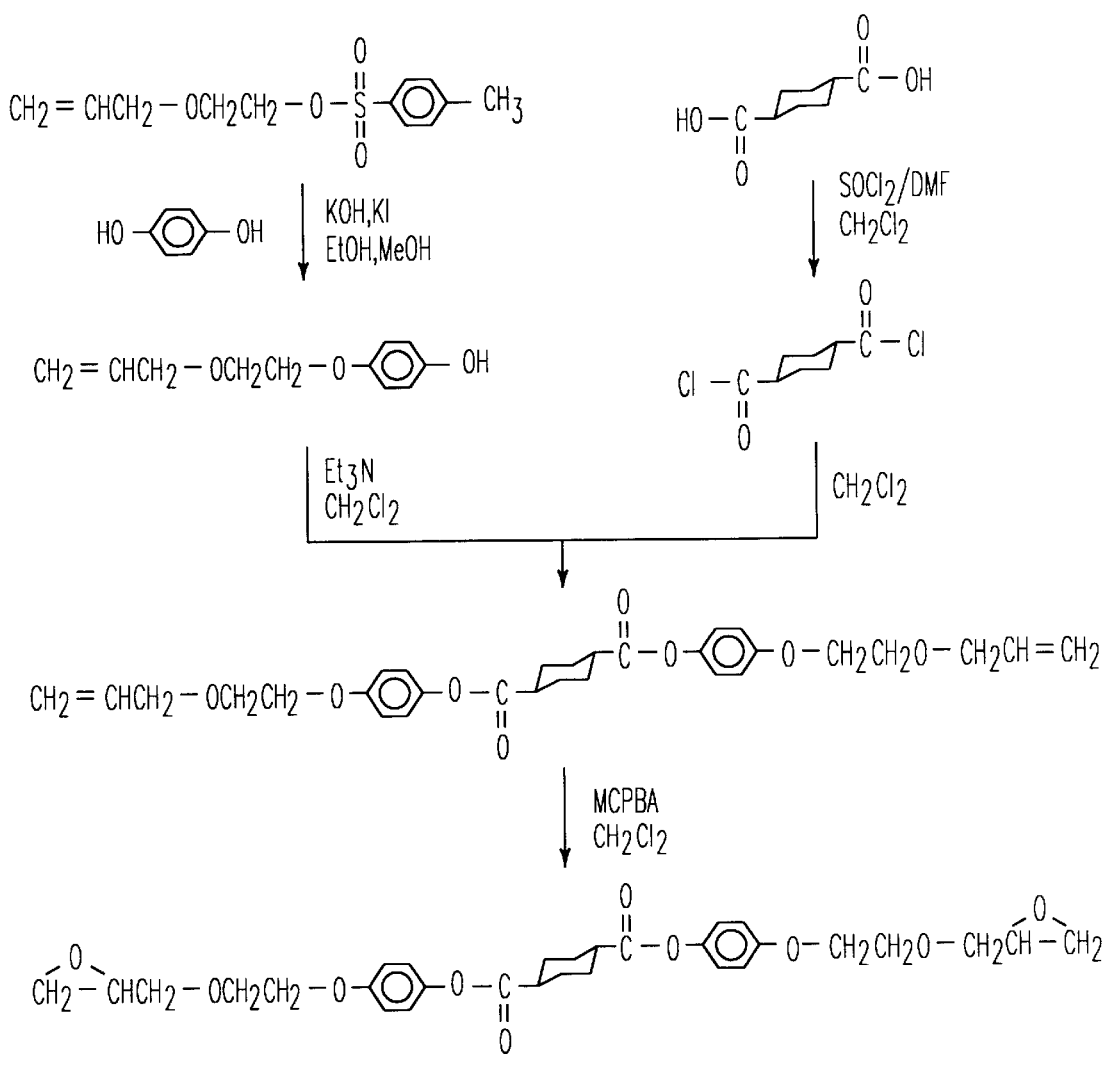
FIG. 3 is a flow diagram for synthesizing of a representative monomer 2M according to the present invention.

FIG. 3 is a flow diagram showing the steps of synthesizing a representative monomer 2M according to the present invention. In a 50 ml of bi-neck bottle, 2.69 g of hydroquinone, 1.68 g of potassium hydroxide, 0.50 g of potassium iodide, 8.0 ml of methanol and 25.0 ml of ethanol are introduced and mixed. 5.23 g of 2-alloyoxy ethyl tosylate is dropped slowly into the bottle and the resulting mixture is subsequently heated to the boiling point thereof. After the solvent is distillated off, 100.0 ml of cold water is added and 6N HCl is dropped until the mixture becomes weakly acidic. Then the resulting mixture is subjected to extraction using ether. The organic layer is subjected to dehydration using magnesium sulfate, filtration, concentration and further purification with silica gel column chromatography, thereby obtaining a brown liquid product, 4-(2-alloyoxyethanoxy)phenol.

In a first tri-necked bottle, 3.25 g of 4-(2-alloyoxyethanoxy)phenol, 2.0 ml of triethylamine, $Et_3N$, and 10.0 ml of anhydrous dichloromethane, $C_2H_2Cl_2$, are introduced to form a clear solution.

In a second tri-necked bottle, 1.37 g of trans-cyclohexane-1,4-dicarboxylic acid, 2 drops of N,N-dimethylformamide, DMF, and 5.0 ml of anhydrous dichloromethane are introduced and 6.00 g of sulfonylchloride, $SOCl_2$, is injected through a needle. After the solution is clear for 1 hr, the remainder sulfonylchloride and solvent are drawn out, extra 5.0 ml of anhydrous dichloromethane is introduced and then the bottle is put in an ice bath. The solution in the first tri-necked bottle is injected into the second tri-necked bottle with a needle for carring out a reaction at room temperature. The resulting product is subjected to extraction with dichloromethane and water. The organic layer is subjected to dehydration using magnesium sulfate, filtration, concentration and further purification with silica gel column chromatography, thereby obtaining a white crystalline, trans-1,4-bis[4-(4-(2-alloyoxyethanoxy))phenyl]cyclohexanedicarboxylate.

In a 50 ml of brown di-necked bottle, 3.45 g of meta-chloroperoxybenzoic acid, MCPBA, and 25.0 ml of anhydrous dichloromethane are introduced. Subsequently, the trans-1,4-bis[4-(4-(2-alloyoxyethanoxy))phenyl]cyclohexanedicarboxylate produced is dissolved in 10.0 ml of dichloromethane and then dropped into the brown di-necked bottle via a separatory funnel. The organic layer is subjected to dehydration using magnesium sulfate, filtration, concentration and further purification with silica gel column chromatography, thereby obtaining a white crystalline, i.e. the representative monomer, 2M. Yield: 63.7%.

EXAMPLE 3

Synthesis of Representative Monomer 3M

Figure 4:
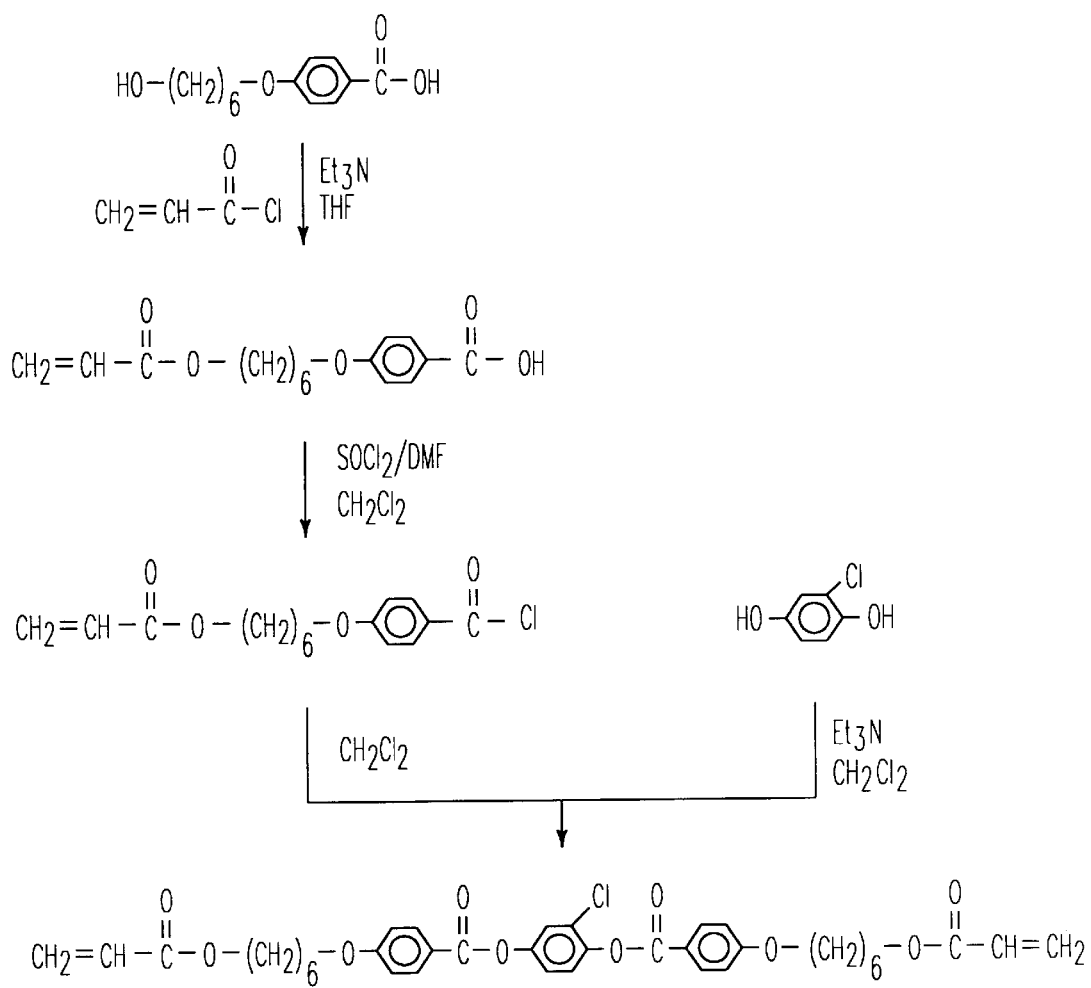
FIG. 4 is a flow diagram for synthesizing of a representative monomer 3M according to the present invention.

FIG. 4 is a flow diagram showing the steps of synthesizing a representative monomer 3M according to the present invention. In a 150 ml of bi-neck bottle, 4.00 g of 4-(6-hydroxylhexane-1-oxy)benzoic acid, 2 equivalent of anhydrous triethylamine, $Et_3N$, and 100.0 ml of anhydrous tetrahydrofuran, THF, are introduced and mixed. 4.00 g of alloychloride is dropped slowly into the bottle in an ice bath and the resulting mixture is subsequently heated to room point. Then, 100.0 ml of cold water is added and the resulting mixture is subjected to extraction using dichloromethane. The organic layer is subjected to dehydration using magnesium sulfate, filtration, concentration and further purification with silica gel column chromatography, thereby obtaining a white solid product, 4-(6-alloyoxyethanoxy)benzoic acid.

In a first tri-necked bottle, 0.5 g of 2-chloro-4-hydroquinone, 4.23 ml of triethylamine, $Et_3N$, and 50.0 ml of anhydrous dichloromethane, $C_2H_2Cl_2$, are introduced to form a clear solution.

In a second tri-necked bottle, 2.00 g of 4-(6-alloyoxyethanoxy) benzoic acid, 2 drops of N,N-dimethylformamide, DMF, and 10.0 ml of anhydrous dichloromethane, $C_2H_2Cl_2$, are introduced to form a clear solution. 2.0 g of sulfonylchloride, $SOCl_2$, is injected through a needle. After the solution is clear for 1 hr, the remainder sulfonylchloride and solvent are drawn out, extra 8.0 ml of anhydrous dichloromethane is introduced and then the bottle is put in an ice bath. The solution in the first tri-necked bottle is injected into the second tri-necked bottle through a needle for carring out a reaction at room temperature. The resulting product is subjected to extraction with dichloromethane and water. The organic layer is subjected to dehydration using magnesium sulfate, filtration, concentration and further purification with silica gel column chromatography, thereby obtaining a white solid product, i.e. the representative monomer, 3M. Yield: 88.1%.

EXAMPLE 4

Synthesis of Representative Monomer 4M

Figure 5:
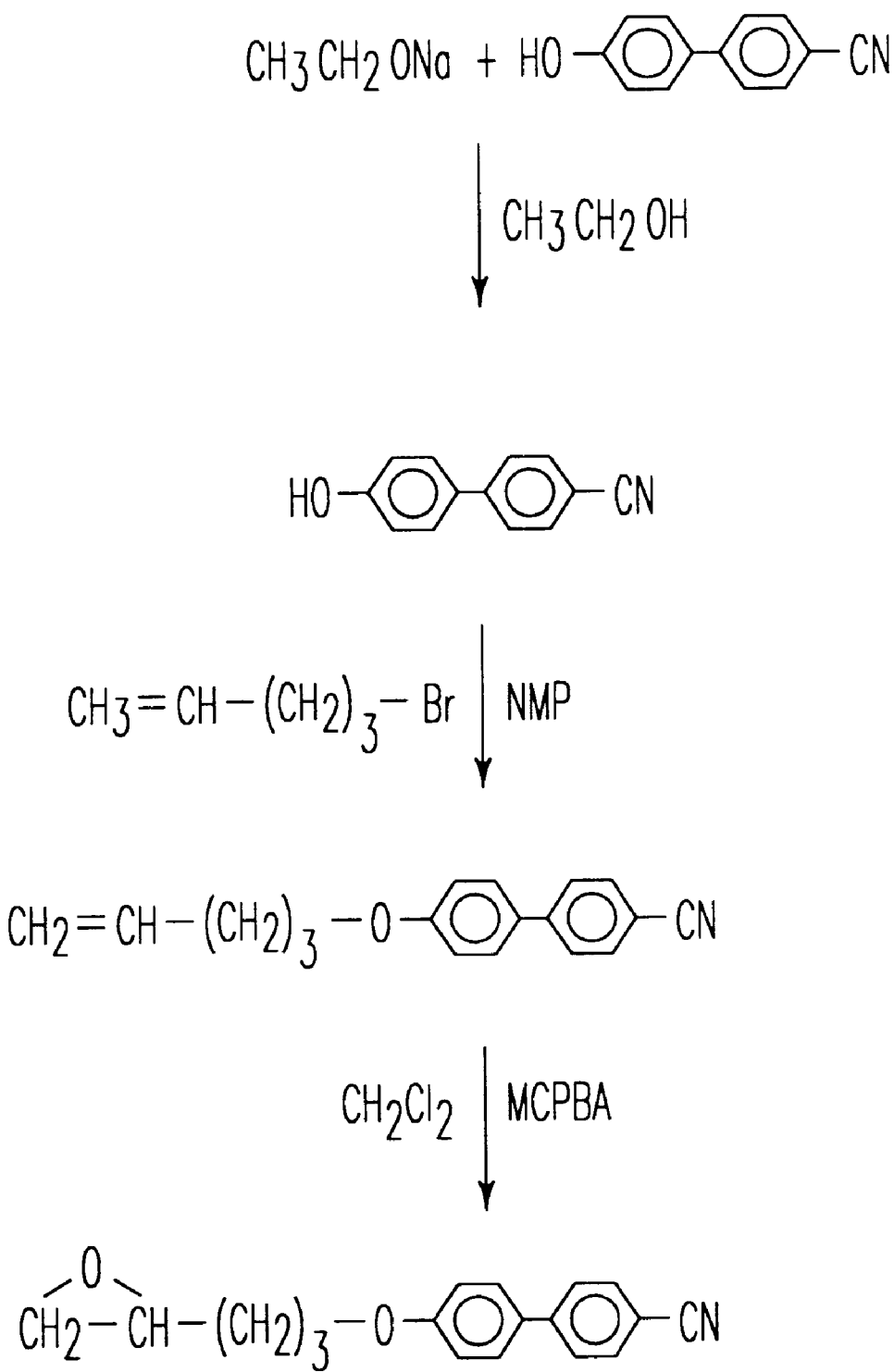
FIG. 5 is a flow diagram for synthesizing of a representative monomer 4M according to the present invention.

FIG. 5 is a flow diagram showing the steps of synthesizing a representative monomer 4M according to the present invention. In a 30.0 ml of bi-neck bottle, sodium ethanoxide and 4.00 g of 4-hydroxyl-4'-cyanobiphenyl are introduced. After the solution is stirred and dried, a yellow solid sodium salt is obtained. The yellow solid sodium salt is subsequently dissolved in 10.0 ml of anhydrous N-methyl-2-pyrrolidinone, NMP, and 0.61 g of 1-bromo-4-pentene is injected with a needle. A reaction is carried out by heating, and the resulting mixture is further purification with silica gel column chromatography, thereby obtaining a white solid product, 4-(4-pentyloxy)-4'-cyanobiphenyl.

In a 50 ml of brown di-necked bottle, 2.81 g of meta-chloroperoxybenzoic acid, MCPBA, and 25.0 ml of anhydrous dichloromethane are introduced. Subsequently, the 4-(4-pentyloxy)-4'-cyanobiphenyl produced is dissolved in 10.0 ml of dichloromethane and then dropped into the brown di-necked bottle via a separatory funnel. The organic layer is subjected to dehydration using magnesium sulfate, filtration, concentration and further purification with silica gel column chromatography, thereby obtaining a white crystalline, i.e. the representative monomer, 4M. Yield: 71.3%.

EXAMPLE 5

Preparation of Liquid Crystal Cell

The method of preparing a liquid crystal cell includes steps:
1) taking two pieces of clean glass;
2) forming a twisted coating polyimide film on each clean glass to form an aligned film by two-stage cross-linkage, i.e. 80° C. for 15 min and 170° C. for 1 hr;
3) orientatedly rubbing each aligned film three times in the same direction with an orientation machine;
4) pasting an AB glue at a thickness of 6 micrometer onto two ends of one piece of glass, i.e. lower glass, having the aligned film;
5) covering the glass mentioned in step 4 with the other glass, i.e. upper glass, having the aligned film; and
6) pressing the upper glass for several minutes to form a crystal liquid cell.

If the bottom glass is covered with the top glass in opposite direction, a parallel crystal liquid crystal is formed; however, if the bottom glass is covered with the top glass in the direction at an angle of 90 to 270 degree, a twisted crystal liquid crystal is formed.

EXAMPLE 6

Figure 6A:
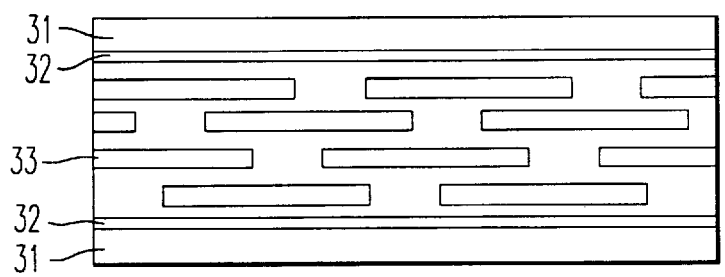
FIG. 6 is a schematic view of a compensator aligned in parallel according to the first embodiment of the present invention.
Figure 6B:
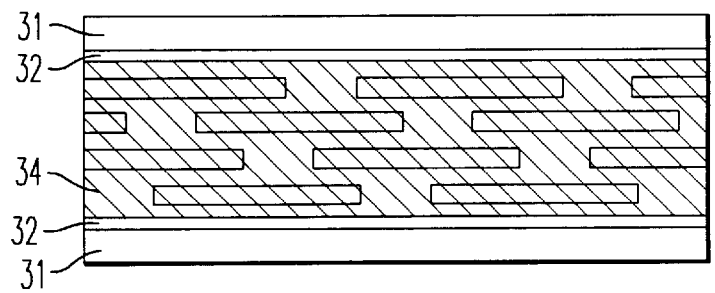

FIG. 6 is a schematic view of a compensator aligned in parallel according to the first embodiment of the present invention. A parallel crystal liquid crystal is formed with two pieces of transparent glass 31, wherein each glass is subjected to rubbing an aligned film 32. A UV-curable liquid crystal monomer 33 is filled into the parallel crystal liquid cell, thereby the liquid crystal monomer 33 being arranged in parallel. The liquid crystal monomer 33 is illuminated with a UV light to form a parallel-aligned viewing angle compensator 34 for the liquid crystal display.

EXAMPLE 7

Figure 7A:
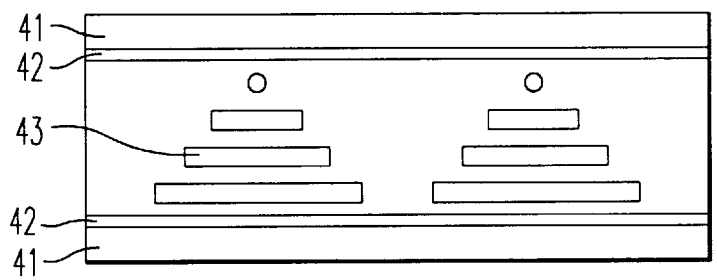
FIG. 7 is a schematic view of a twist-aligned compensator according to the first embodiment of the present invention.
Figure 7B:
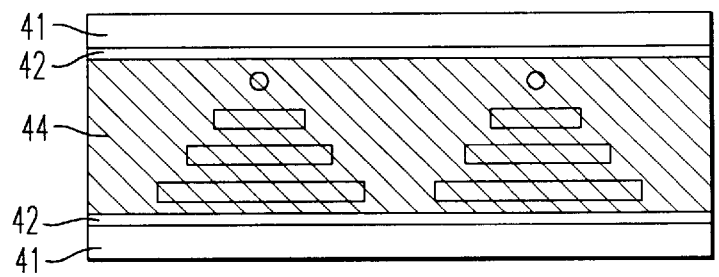

FIG. 7 is a schematic view of a twist-aligned compensator according to the first embodiment of the present invention. A twist-aligned crystal liquid crystal is formed with two pieces of transparent glass 41, wherein each glass is subjected to rubbing an aligned film 42. A UV-curable liquid crystal monomer 43 is filled into the twisted crystal liquid cell, thereby the liquid crystal monomer 33 being arranged in parallel. The liquid crystal monomer 43 is illuminated with a UV light to form a twisted-aligned viewing angle compensator 44 for the liquid crystal display.

EXAMPLE 8

Figure 8:
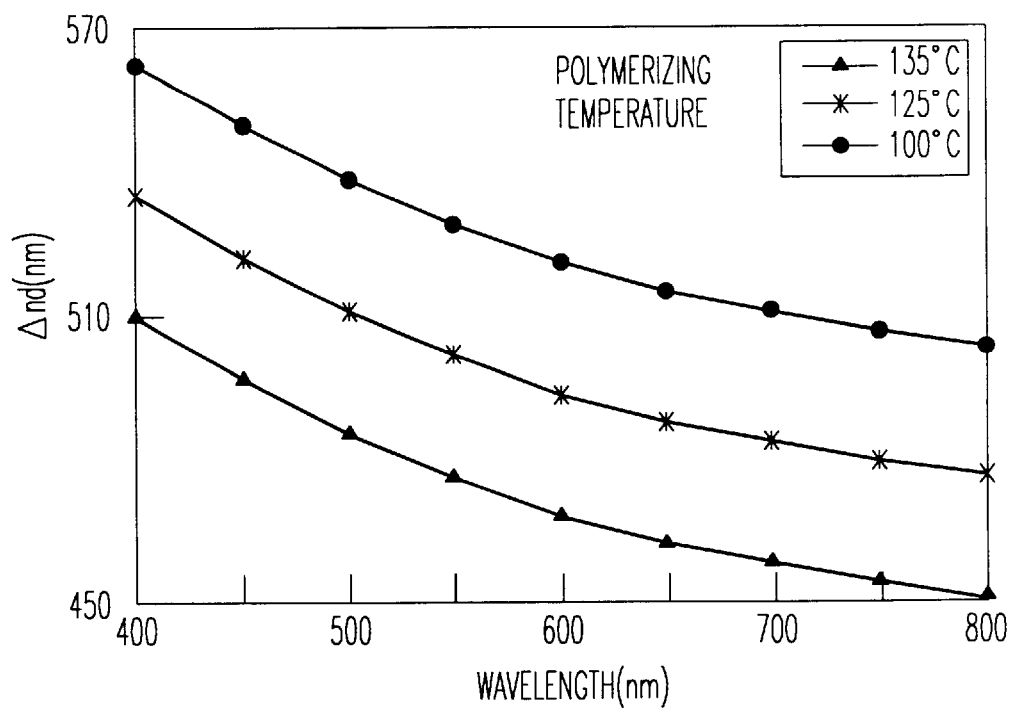
FIG. 8 is a diagram showing the relation between the retardation value and wavelength for the compensator according to the second embodiment of the present invention.

FIG. 8 is a diagram showing the relation between the retardation value and wavelength for the compensator prepared by monomer 1M according to the second embodiment of the present invention. The comparator is prepared by heating a monomer 1M in combination with 1 wt % of biphenyliodonium hexafluoroarsenate as a photoinitiator at a temperature of 100° C., filling the resulting mixture into two parallel-aligned glass substrates, and illuminating the glass substrates with UV light for 5 min. at the polymerizing temperatures of 135, 125 and 100° C. The result in FIG. 8 shows that the retardation value, $\Delta n \cdot d$, of the polymeric film decreases as the polymerizing temperature increases.

EXAMPLE 9

Figure 9:
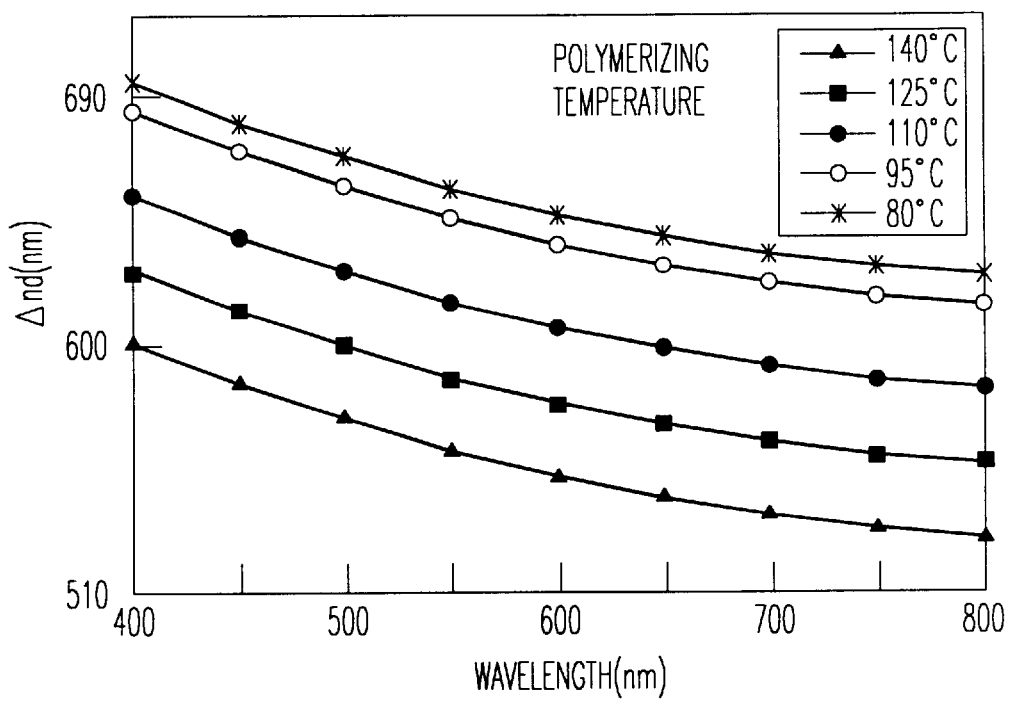
FIG. 9 is a diagram showing the relation between the retardation value and wavelength for the compensator according to the third embodiment of the present invention.

FIG. 9 is a diagram showing the relation between the retardation value and wavelength for the compensator prepared by monomer 2M according to the third embodiment of the present invention. The comparator is prepared by heating a monomer 2M in combination with 1 wt % of biphenyliodonium hexafluoroarsenate as a photoinitiator at a temperature of 100° C., filling the resulting mixture into two parallel-aligned glass substrates, and illuminating the glass substrates with UV light for 5 min. at the polymerizing temperatures of 140, 125, 110, 95 and 80° C. The result in FIG. 9 shows that the retardation value, $\Delta n \cdot d$, of the polymeric film decreases as the polymerizing temperature increases.

EXAMPLE 10

Figure 10:
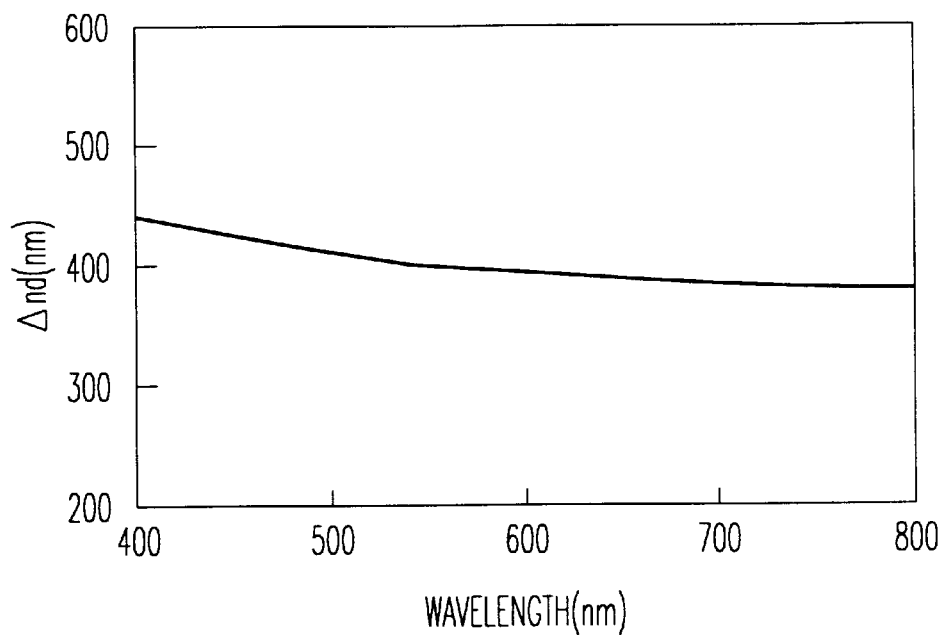
FIG. 10 is a diagram showing the relation between the retardation value and wavelength for the compensator according to the fourth embodiment of the present invention.

FIG. 10 is a diagram showing the relation between the retardation value and wavelength for the compensator prepared by monomer 2M according to the fourth embodiment of the present invention. The comparator is prepared by heating a monomer 2M in combination with 1 wt % of biphenyliodonium hexafluoroarsenate as a photoinitiator at a temperature of 100° C., filling the resulting mixture into two twisted-aligned glass substrates, and illuminating the glass substrates with UV light for 5 min. at the polymerizing temperature of 100° C. The result in FIG. 10 shows that the retardation value, Δn·d, of the polymeric film is less independent on wavelength.

EXAMPLE 11

Figure 11:
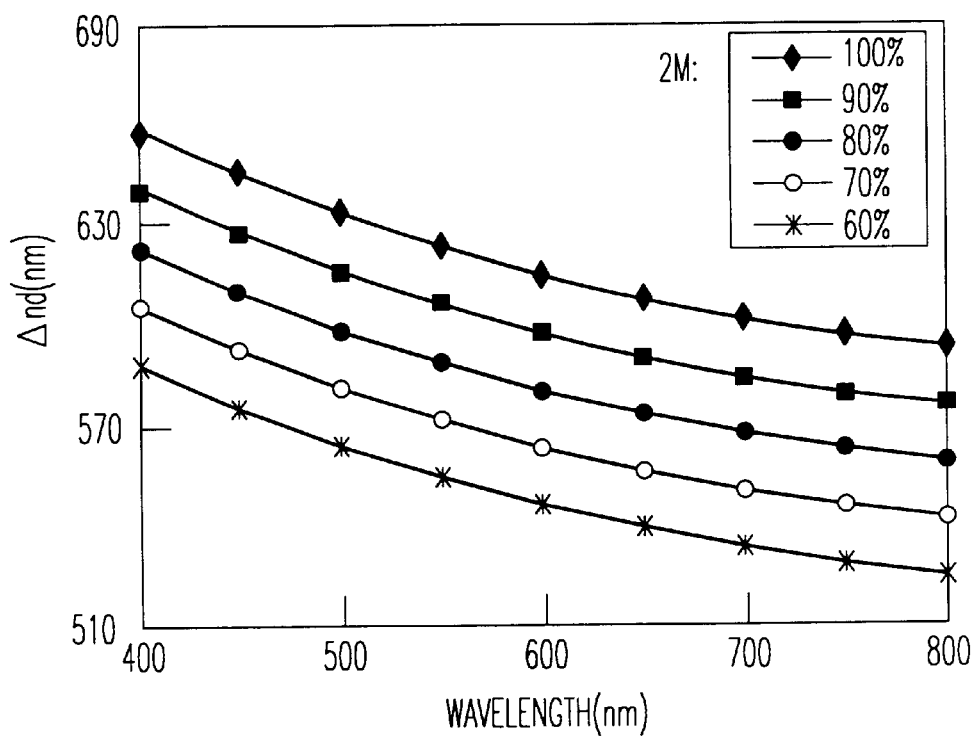
FIG. 11 is a diagram showing the relation between the retardation value and wavelength for the compensator according to the fifth embodiment of the present invention.

FIG. 11 is a diagram showing the relation between the retardation value and wavelength for the compensator prepared by a monomer 2M and a non-liquid crystal monomer 5M according to the fifth embodiment of the present invention. The comparator is prepared by heating a mixture of a monomer 2M and a non-liquid crystal monomer 5M at different weight ratio (the phase transition temperature measured by DSC shows that the transition temperature decreases as the percentage of the non-liquid crystal monomer increases) in combination with 1 wt % of biphenyliodonium hexafluoroarsenate as a photoinitiator at a temperature of 100° C., filling the resulting mixture into two parallel-aligned polytriacetylcellulose substrates, and illuminating the glass substrates with UV light for 5 min. at the polymerizing temperature of 80° C. The result in FIG. 10 shows that the retardation value, Δn·d, of the polymeric film is less independent on wavelength. The result in FIG. 11 shows that the retardation value, Δn·d, of the polymeric film decreases as the content of the non-liquid crystal monomer 5M increases.

EXAMPLE 12

Figure 12:
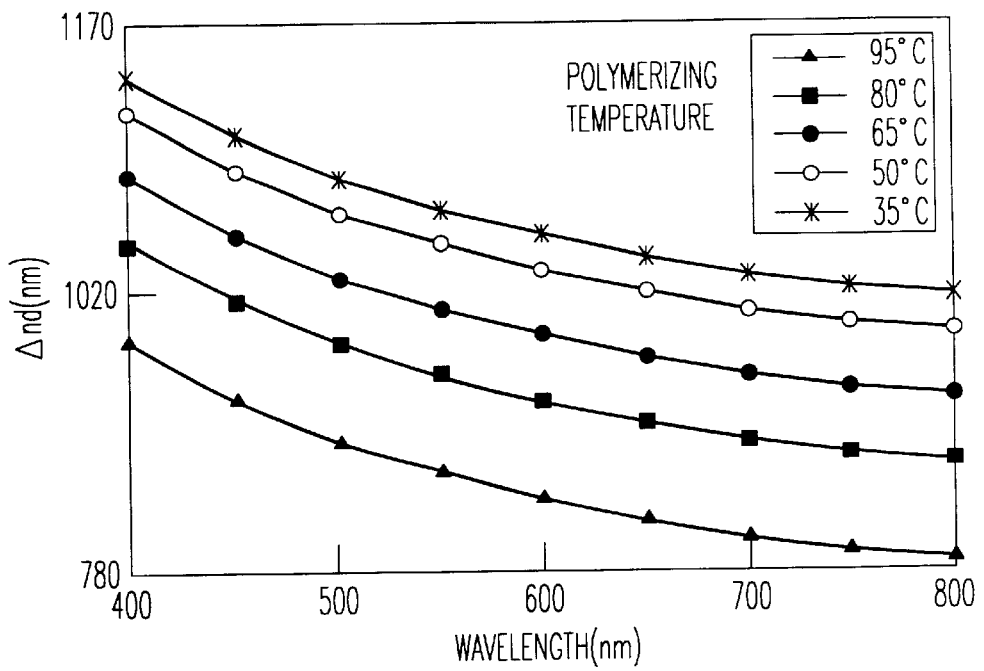
FIG. 12 is a diagram showing the relation between the retardation value and wavelength for the compensator according to the sixth embodiment of the present invention.

FIG. 12 is a diagram showing the relation between the retardation value and wavelength for the compensator prepared by monomer 3M according to the sixth embodiment of the present invention. The comparator is prepared by heating a monomer 3M in combination with 1 wt % of benzophenone as a photoinitiator at a temperature of 110° C., filling the resulting mixture into two parallel-aligned glass substrates, and illuminating the glass substrates with UV light for 5 min. at the polymerizing temperatures of 95, 80, 65, 50 and 30° C. The result in FIG. 12 shows that the retardation value, Δn·d, of the polymeric film decreases as the polymerizing temperature increases.

EXAMPLE 13

Figure 13:
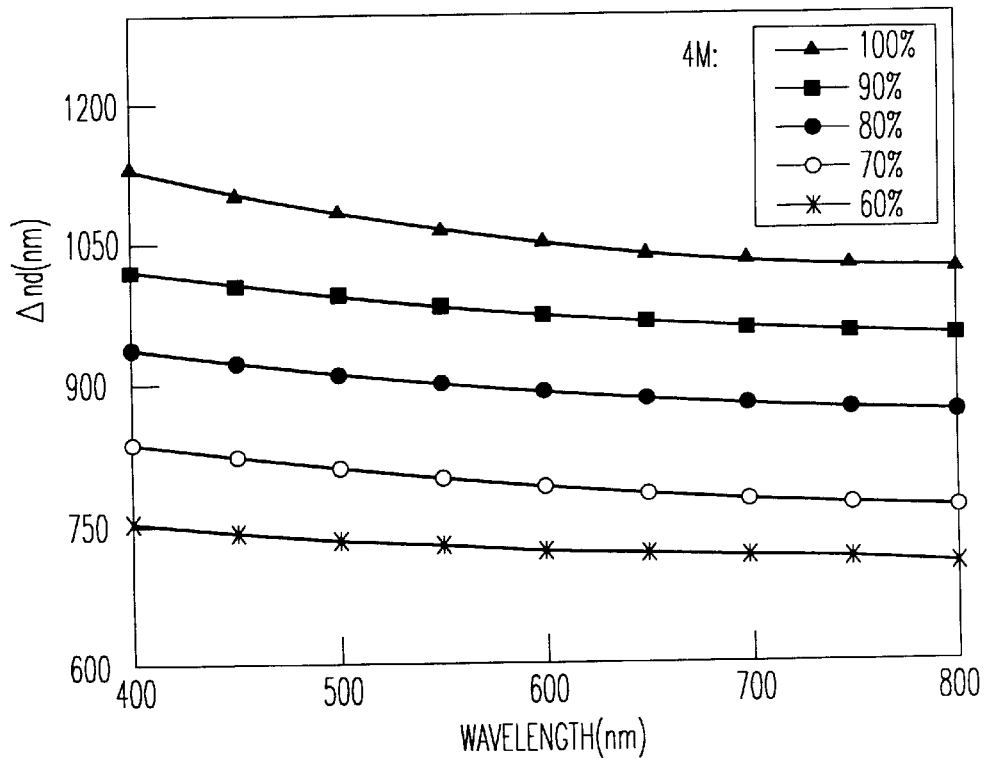
FIG. 13 is a diagram showing the relation between the retardation value and wavelength for the compensator according to the seventh embodiment of the present invention.

FIG. 13 is a diagram showing the relation between the retardation value and wavelength for the compensator prepared by a monomer 3M and a non-liquid crystal monomer 6M according to the seventh embodiment of the present invention. The comparator is prepared by heating a mixture of a monomer 3M and a non-liquid crystal monomer 6M at different weight ratio (the phase transition temperature measured by DSC shows that the homogeneous phase point decreases, the melting temperature increases and the temperature range of nematic liquid crystal phase becomes narrow as the percentage of the non-liquid crystal monomer increases) in combination with 1 wt % of benzophenone as a photoinitiator at a temperature of 100° C., filling the resulting mixture into two parallel-aligned glass substrates, and illuminating the glass substrates with UV light for 5 min. at the polymerizing temperature of 100° C. The result in FIG. 13 shows that the retardation value, Δn·d, of the polymeric film decreases and is less independent on wavelength as the content of the non-liquid crystal monomer 6M increases.

EXAMPLE 14

A comparator is prepared by heating a mixture of a monomer 4M and a non-liquid crystal monomer 7M at different weight ratio in combination with 1 wt % of biphenyliodonium hexafluoroarsenate and benzophenone as photoinitiators at a temperature of 100° C., filling the resulting mixture into two parallel-aligned glass substrates, and illuminating the glass substrates with UV light for 5 min. at the temperature of liquid crystal phase. It is shown that the mobility of the liquid crystal increases as the content of the liquid crystal monomer 4M increases. Thus, the period for filling and tempering the crystal liquid monomers as a regular arrangement is shorter.

Figure 14:
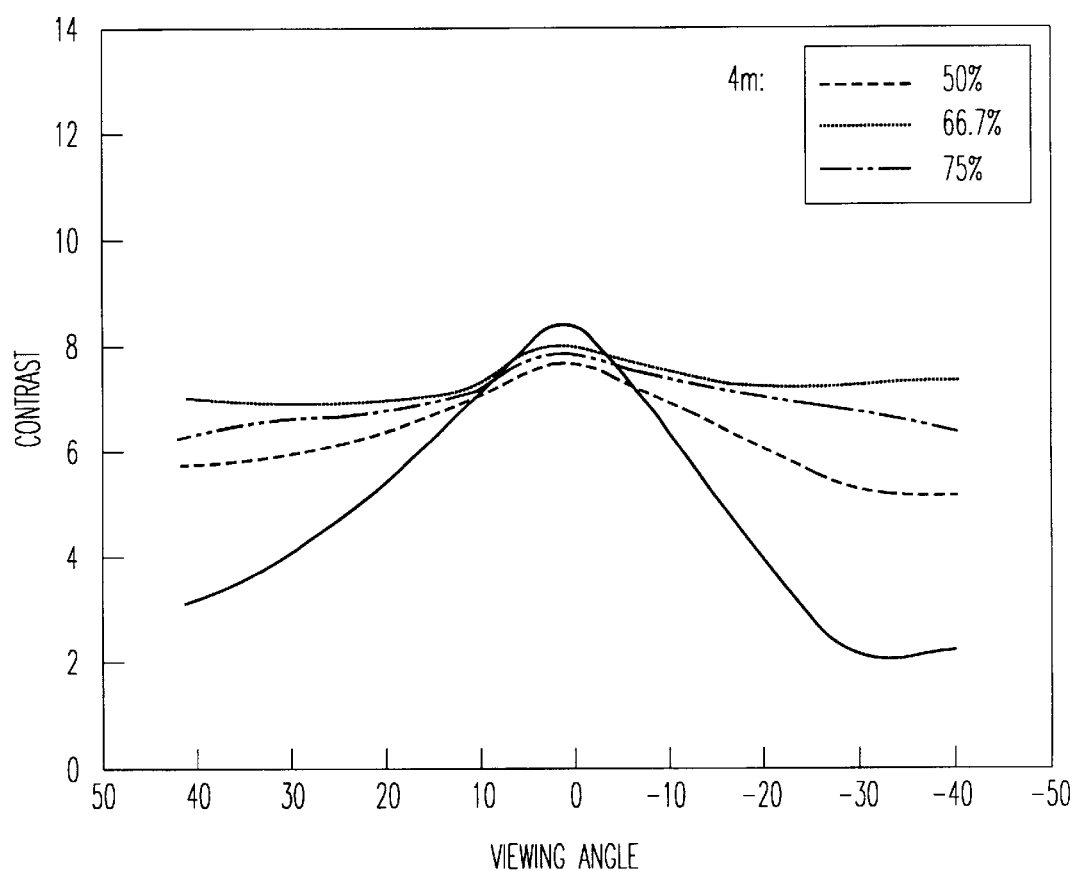
FIG. 14 is a diagram showing the relation between the contrast and viewing angle for the compensator according to the eighth embodiment of the present invention applied to a liquid crystal display.

The substrates covering the compensator containing 4M at different weight ratio are removed and the compensator is arranged on a liquid crystal display. The relation between the contrast and the viewing angle of the liquid crystal display is shown in FIG. 14. The contrast decreases apparently as the viewing angle changes, e.g. the contrast diminishes about 50% of the original state at a viewing angle of about 25 degree, by using a liquid crystal display without the compensator of the present invention. However, the contrast is still high even though the viewing angle is large by using a liquid crystal display with the compensator of the present invention, e.g. the contrast only diminishes about 25% at a viewing angle of 40 degree.

The compensator according to the present invention provides high performance of improving viewing angle and coloration for a liquid crystal display. The method for fabricating such a compensator by polymerizing a UV-curable liquid crystal monomer is feasible and easily controlled.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structure.

What is claimed is:

1. A method for producing a viewing angle compensator comprising:

a) aligning two glass substrates desposed in one of parallel alignment and twisted alignment;

b) injecting a UV-curable liquid crystal monomer between said two aligned glass substrates; and c) polymerizing said UV-curable liquid crystal monomer to form a viewing angle compensator for a liquid crystal display.

2. The method according to claim 1, wherein the step a) includes:

a1) coating an alignment film on each of said two substrates and a2) orientatedly rubbing said alignment film.

3. The method according to claim 2, wherein said alignment film is cross-linked with a polymeric material selected from a group consisting of ploymide and polyvinyl alcohol.

4. The method according to claim 1, wherein said twisted alignment is the liquid crystal monomer twist-aligned at an angle of about 90 to 270 degree.

5. The method according to claim 1, wherein said liquid crystal monomer is one selected from a group consisting of liquid crystal acrylate, liquid crystal methyl acrylate, liquid crystal ethylene oxide, liquid crystal bisacrylate, liquid crystal bismethylacrylate and liquid crystal bisethyleneoxide represented as the following formula I, II, III, IV, V and VI, respectively:

(I)

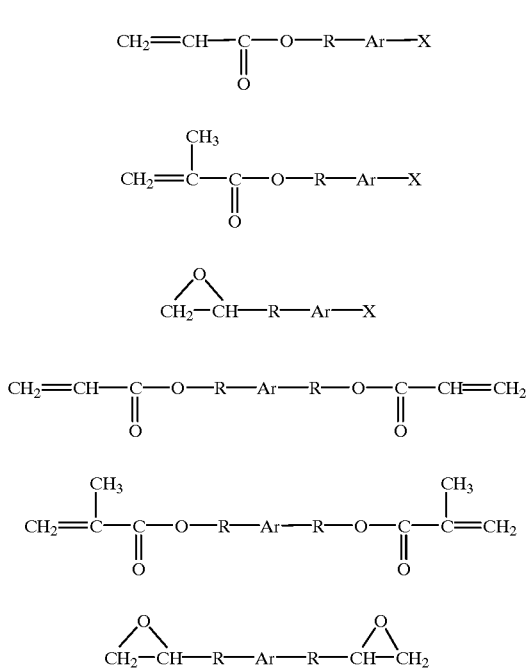

(II)
(III)
(IV)
(V)
(VI)

where R is one of methylene and methylenoxy, X is a terminated radical selected from a group consisting of cyano, alkanoxy and alkyl, and Ar is a radical group selected from a group consisting of

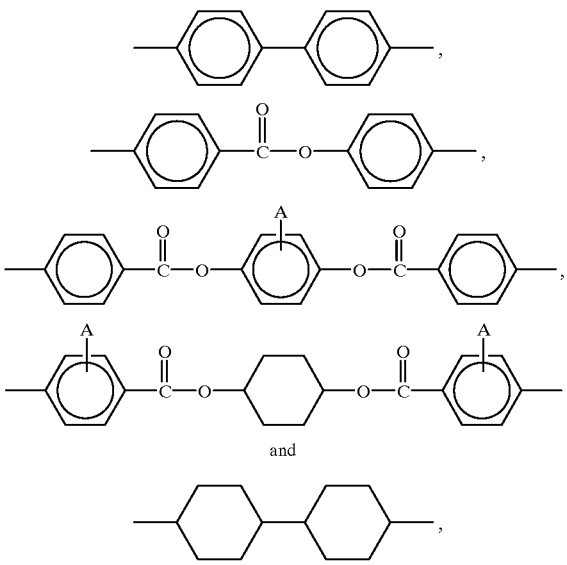

where A is one selected from a group consisting of hydrogen, alkyl and halogen.

6. The method according to claim 1, wherein prior to said step b) further includes a step b1) mixing said UV-curable liquid crystal monomer and a non-liquid crystal monomer.

7. The method according to claim 6, wherein said non-liquid crystal monomer is one selected from a group consisting of non-liquid crystal bisacrylate, non-liquid crystal bismethylacrylate and non-liquid crystal bisethyleneoxide represented by the following formula VII, VIII and IX:

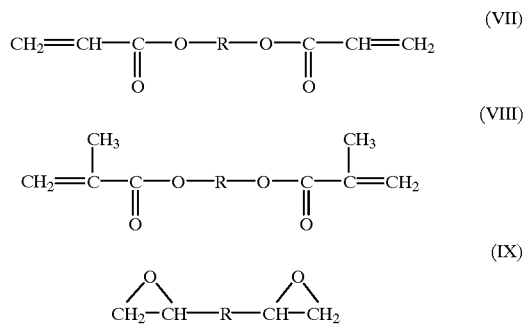

(VII)
(VIII)
(IX)

where R is one of methylene and methylenoxy.

8. The method according to claim 6, wherein between said step b1) and said step b) further includes a step b2) adding a photoinitiator to said liquid crystal monomer.

9. The method according to claim 8, wherein said photoinitiator is a radical photoinitiator selected from a group consisting of benzoin, benzil and benzophenone.

10. The method according to claim 8, wherein said photoinitiator is a cationic photoinitiator selected from a group consisting of biphenyliodonium hexafluoroarsenate, diaryliodonium hexafluoroantimonate and triarylsulfonium hexafluoroantimonate.

11. The method f according to claim 1, wherein said step c) is conducted by polymerizing said UV-curable liquid crystal monomer at a polymerizing temperature.

12. The method according to claim 8, wherein said polymerizing temperature is in the range between 30° C. and 150° C.

13. A method for producing a viewing angle compensator comprising:

a) aligning two glass substrates;

b) injecting a UV-curable liquid crystal monomer between said two aligned glass substrates;

c) polymerizing said UV-curable liquid crystal monomer; and d) removing said glass substrates to form said viewing angle compensator for a liquid crystal display, wherein said UV-curable liquid crystal monomer is one selected from the group consisting of liquid crystal acrylate, liquid crystal methyl acrylate, liquid crystal ethylene oxide, liquid crystal bisacrylate, liquid crystal bismethylacrylate and liquid crystal bisethyleneoxide represented by the following formulae I, II, III, IV, V and VI, respectively:

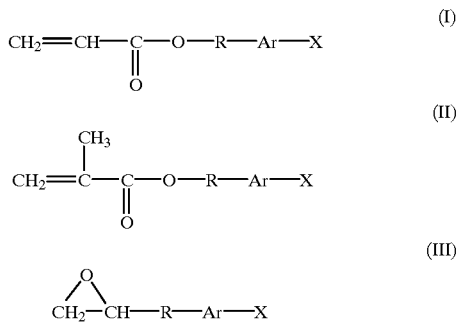

(I)
(II)
(III)

(IV)
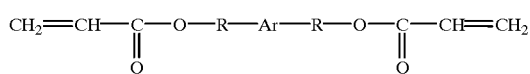
(V)
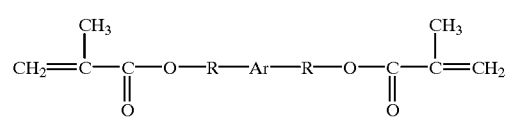
(VI)
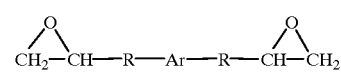
where R is one of methylene and methylenoxy, X is a terminated radical selected from a group consisting of cyano, alkanoxy and alkyl, and Ar is a radical group selected from a group consisting of
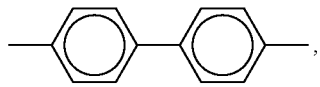
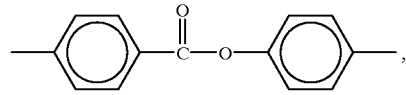,
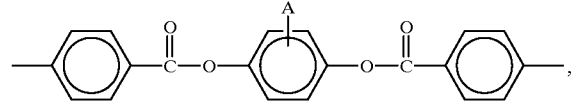,
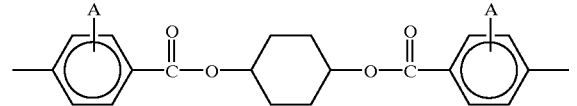
and
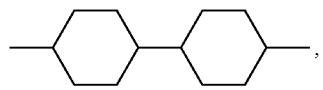,
where A is selected from the group consisting of hydrogen, alkyl and halogen.
* * * * *